US007014398B1

(12) United States Patent
Hellwig

(10) Patent No.: US 7,014,398 B1
(45) Date of Patent: Mar. 21, 2006

(54) MOTORCYCLE AND ATV RACKING SYSTEM FOR A VEHICLE

(76) Inventor: Mark Hellwig, 438 SE. St., Exeter, CA (US) 93221-1737

( * ) Notice: Subject to any disclaimer, the term of this patent is extended or adjusted under 35 U.S.C. 154(b) by 0 days.

(21) Appl. No.: 11/020,949

(22) Filed: Dec. 21, 2004

(51) Int. Cl.
*B60P 3/06* (2006.01)
(52) U.S. Cl. .................... 410/7; 410/9; 410/19; 410/78
(58) Field of Classification Search .................... 410/7, 410/8, 9, 10, 16, 19, 77, 78; 296/3; 211/13.1; 224/403
See application file for complete search history.

(56) References Cited

U.S. PATENT DOCUMENTS

| | | | | |
|---|---|---|---|---|
| 2,583,216 | A | * | 1/1952 | Hoffman ...................... 414/427 |
| 4,596,506 | A | * | 6/1986 | Burgardt et al. ............. 414/426 |
| 5,439,152 | A | * | 8/1995 | Campbell .................... 224/405 |
| 5,516,020 | A | * | 5/1996 | Lawler et al. ............... 224/405 |
| 5,556,064 | A | * | 9/1996 | Cowe .......................... 248/172 |
| D433,989 | S | * | 11/2000 | Shimmell, Sr. ............. D12/408 |
| 6,371,309 | B1 | * | 4/2002 | Smith .......................... 211/22 |
| 6,679,408 | B1 | * | 1/2004 | Thomas et al. ............. 224/403 |
| 6,786,373 | B1 | * | 9/2004 | Pierce et al. ................ 224/501 |

OTHER PUBLICATIONS http://www.toyhauleraccessories.com/home.htm, Mar. 11, 2005.

* cited by examiner

*Primary Examiner*—H. Gutman
(74) *Attorney, Agent, or Firm*—Louis J. Bovasso, Esq.; Greenberg Traurig, LLP

(57) ABSTRACT

A racking system for transporting motorcycles and ATVs in an upright position in the bed of a vehicle. The system includes a pair of floor plates that are firmly secured in position in the bed of a vehicle. A rack is removably secured to the floor plates. The rack has a pair of spaced legs on each side thereof, the legs being removably secured to the floor plates. The legs are interconnected at top by a transverse rail with a second rail extending parallel to the first rail interconnected to one of each pair of legs below the first rail. Vertical spacing bars extend between the first and second rails adjustable therealong. In this manner, the wheels of a motorcycle, bicycle or ATV or the like may be fixedly secured between the vertical bars.

14 Claims, 4 Drawing Sheets

MOTORCYCLE AND ATV RACKING SYSTEM FOR A VEHICLE

BACKGROUND OF THE INVENTION

1. Field of the Invention

The invention relates to vehicle racks; and, more particularly, to a motorcycle, bicycle and ATV racking system adapted to be mounted on the bed of a vehicle.

2. Related Art

Users of bicycles, motorcycles and all terrain vehicles (ATVs) usually transport them from place to place on the inside of a utility trailer or camp trailers or on the flat bed of a pickup truck or the like. Such devices must be securely tied and held in place. Motorcycles for one are very difficult to hold upright in a secure position while being transported by trailer.

The latest type of trailer used to transport such vehicles are the Sport Utility Trailer, or Toy Hauler as it is more commonly known. With space for motorcycles, ATVs, personal watercraft and the like, it offers the convenience and luxury of at-home living with the ability to haul one's "toys", all in one unit.

Such devices allow campers to bring along their ATVs, motorcycles, etc. These units are innovative in their design, combining the comfort and features of a travel trailer with space to bring along motorcycles, ATVs and other small vehicles. Such devices even feature a built-in ramp for loading and unloading.

There is a need for a system to hold a motorcycle or ATV or the like safely and secured from moving about the bed of a trailer, or from leaning or falling or otherwise damaging the inside of the trailer or other vehicles.

SUMMARY OF THE INVENTION

It is an object of this invention to provide a racking system for transporting vehicles, such as motorcycles, bicycles, ATV, watercraft, etc. on the bed of a vehicle in an upright position.

It is a further object of this invention to provide such a system which is adapted to use tie down straps and turnbuckles to secure the transported vehicle to various points of the racking system.

It is still further an object of this invention to provide such a racking system which can be easily removed from the bed of the vehicle.

These and other objects of the invention are preferably accomplished by providing a racking system for transporting motorcycles and ATVs in an upright position in the bed of a vehicle. The system includes a pair of floor plates that are firmly secured in position in the bed of a vehicle. A rack is removably secured to the floor plates. The rack has a pair of spaced legs on each side thereof, the legs being removably secured to the floor plates. The legs are interconnected at top by a transverse rail with a second rail extending parallel to the first rail interconnected to one of each pair of legs below the first rail. Vertical spacing bars extend between the first and second rails adjustable therealong. In this manner, the wheels of a motorcycle, bicycle or ATV or the like may be fixedly secured between the vertical bars.

DETAILED DESCRIPTION OF THE PREFERRED EMBODIMENTS

Figure 1:
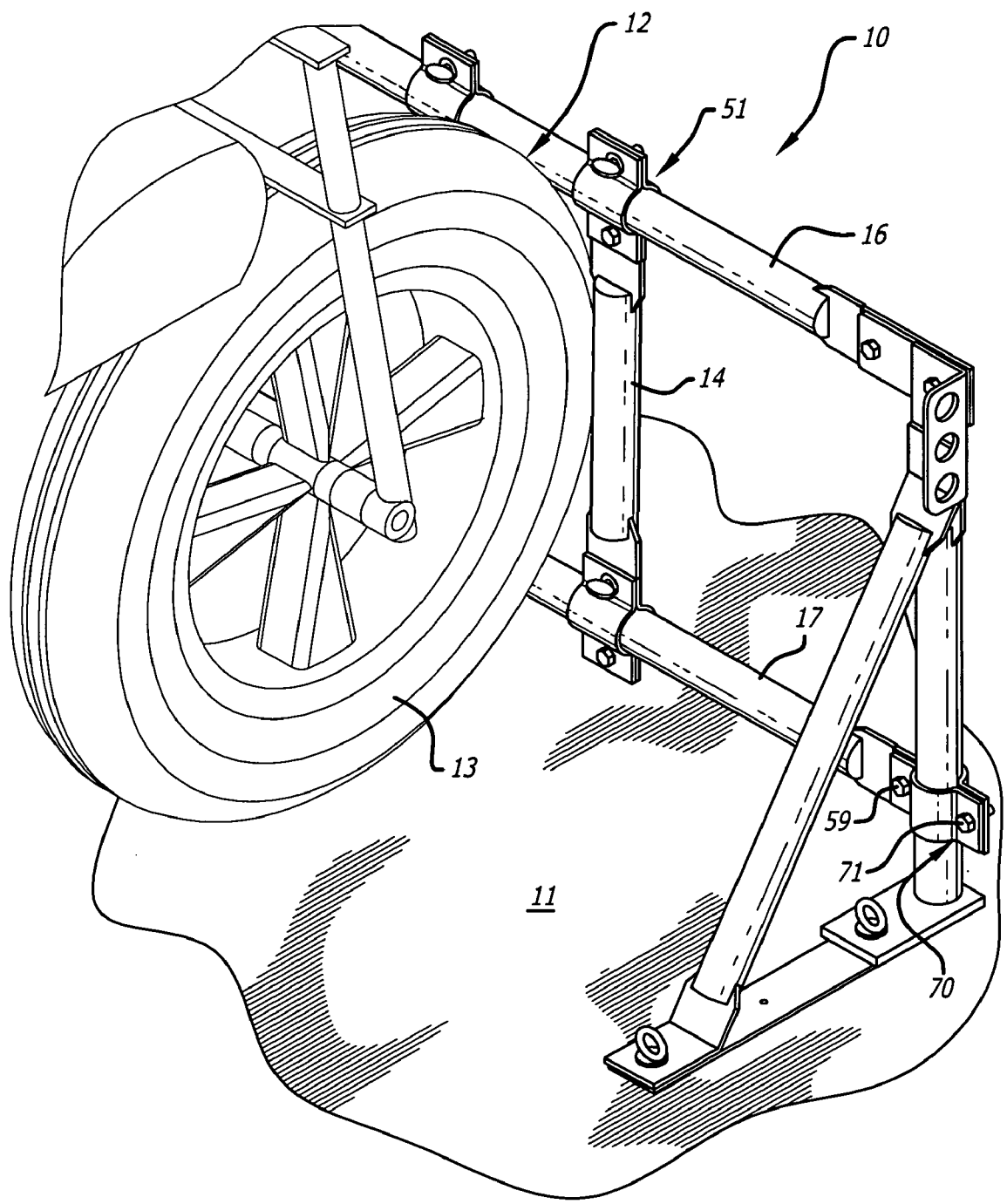
FIG. 1 is a perspective view of a portion of a rack in accordance with the invention mounted on the flatbed of a vehicle or trailer showing the front wheel of a motorcycle mounted thereto.

Referring now to FIG. 1 of the drawing, a racking system 10 is shown mounted on the floor 11 comprising the flatbed of a vehicle used to transport a wheeled device, such as motorcycle 12. As shown, the front wheel 13 of motorcycle 12 is shown disposed between a pair of vertically spaced rod members 14, 15 (see FIG. 2). As will be discussed, although a pair of rod members 14, 15 is shown on racking system 10, a plurality may be provided interconnected to upper and lower transversely extending horizontal rails 16, 17, respectively.

Figures 2, 3:
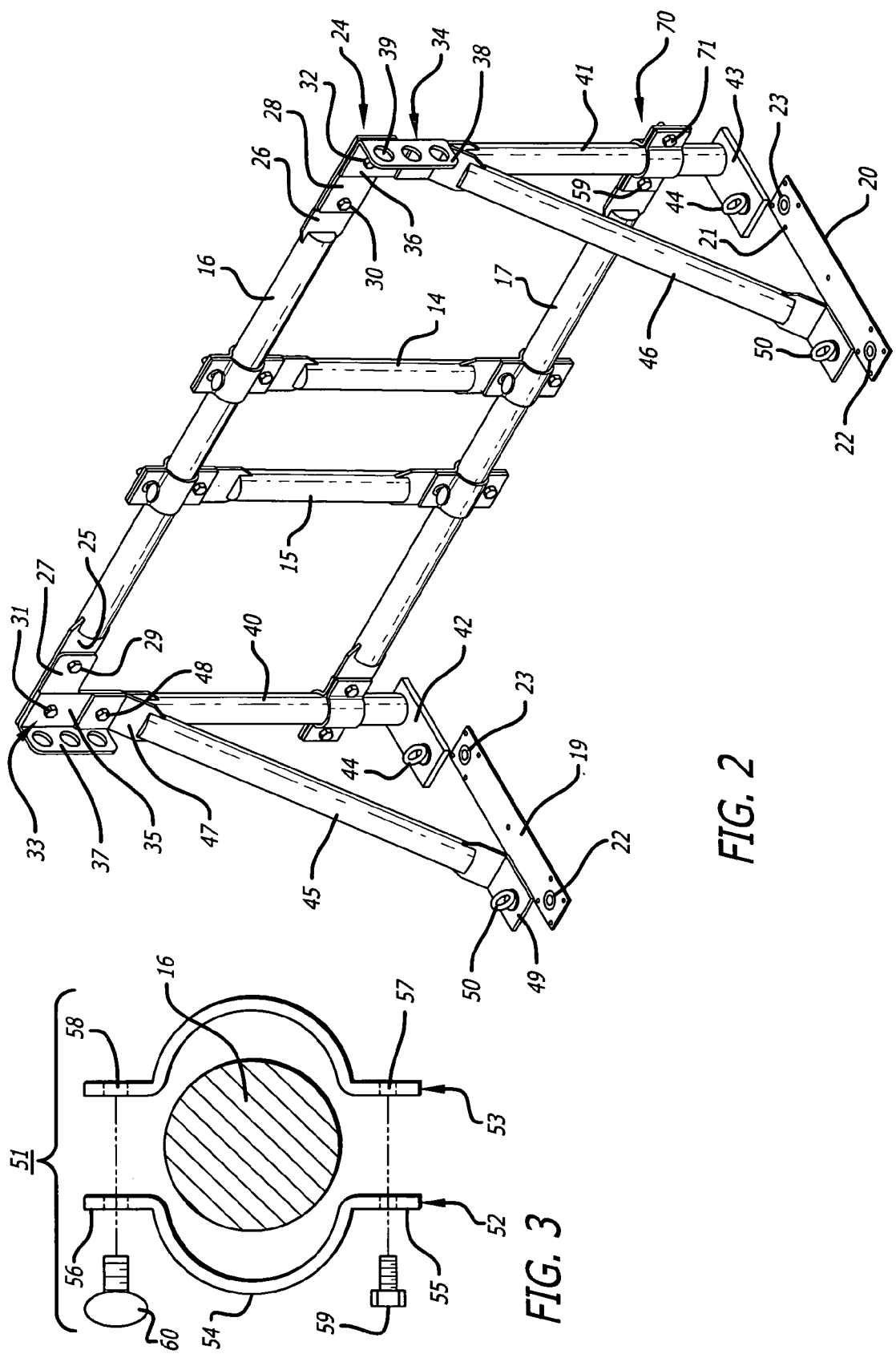
FIG. 2 is a perspective view of the rack alone of FIG. 1.
FIG. 3 is an exploded view of one of the components of the rack of FIG. 1.

Racking system 10 is shown more particularly in FIG. 2. The racking system 10 includes a pair of spaced floor plates 19, 20 which are preferably secured to floor 11 (FIG. 1) in any suitable manner, as for example, by providing a plurality of holes 21 (FIG. 2) at various locations on each floor plate 19, 20 and screws or the like may be inserted in such holes and into floor 11. Alternatively, expanding inserts, as are well known in the art may be provided in floor 11 and screws inserted through holes 21 may be screwed into such inserts. Self-drilling or self-tapping screws may be used where desired.

In such a manner, plates 19, 20 are removably secured to floor 11. Each plate 19, 20 may have a threaded hole at each end (such as holes 22, 23—FIG. 2) or, alternatively, a threaded crushed sleeve may be dropped into a preexisting hole in the floor 11 of a predetermined diameter. When turnbuckle 50 is threaded into such a sleeve, it draws it up and it is crushed against the sides of the hole and back of the plates 19, 20.

Racking system 10 includes a rack 24 adapted to be secured to floor plates 19, 20. Rack 24 includes the aftermentioned upper and lower rails 16, 17 and vertical rods 14, 15. Rails 16, 17 may be tubular, hollow or solid, terminating at each end in flat portions 25, 26. Portions 25, 26 are bolted or otherwise secured to flange portions 27, 28 by bolts 29, 30, respectively. Flange portions 27, 28 are in turn secured, via bolts 31, 32, respectively, to L-shaped flanges 33, 34, respectively. Flanges 33, 34 each have a first portion 35, 36, respectively, integral with a second portion 37, 38, respectively, extending normal thereto. Each portion 37, 38 has a plurality, such as 3, of vertically aligned spaced holes 39 for providing tie down ties or anchor points for tie down straps, as will be discussed.

Flange portions 35, 36 are integral with downwardly extending legs 40, 41 terminating at bottom in locking plates 42, 43, respectively.

Each locking plate 42, 43 has a quick release threaded turn buckle 44 receivable in threaded holes 23.

A pair of diagonally extending tubing rods 45, 46 extend from plates 35, 36, respectively, having flattened ends 47 secured thereto by bolts 48. The bottom ends of rods 45, 46 terminate in flat flange portions 49. Each flange portion 49 has a quick release threaded turn buckle 50 receivable in threaded holes 22. Turn buckles 44, 50 may be fixedly secured to their respective flanges as is well known in the art.

Thus, rack 24 may be quickly and easily secured to floor plates 19, 20 and removed therefrom when desired.

As seen in FIG. 1, upper and lower rails 16, 17 extend through adjustable collars 51.

Collar 51 is shown in exploded view in FIG. 3. Each collar 51 includes a mating pair of flanges 52, 53. Each flange 52, 53 includes an outwardly central curved portion 54 and flat integral end flange portions 55, 56 on each side thereof. Aligned threaded holes 57, 58 extend through flange portions 55, 56, respectively. Bolts 59 secure flat end flange portions 55 together whereas a turn bolt 60 threads into holes 58 to secure flat end flange portions 56 together. As seen in FIG. 3, rail 16 extends between mating curved portions 54 and collars 51 may be adjustable along rails 16, 17 by selectively turning and loosening turn bolts 60. In this manner, as seen in FIG. 1, the wheel of the motorcycle or ATV or the like is disposed within the spacing between adjacent rods 14, 15. Although only 2 spaced rods 14, 15 are shown, obviously a plurality may be used.

Collars 70 (FIG. 2) interconnect the lower ends of posts 40, 41 to the bottom rail 17. Collars 70 are otherwise identical to collars 51 but the adjustable bolt 60 may be replaced by a regular threaded bolt 71'.

Figure 4:
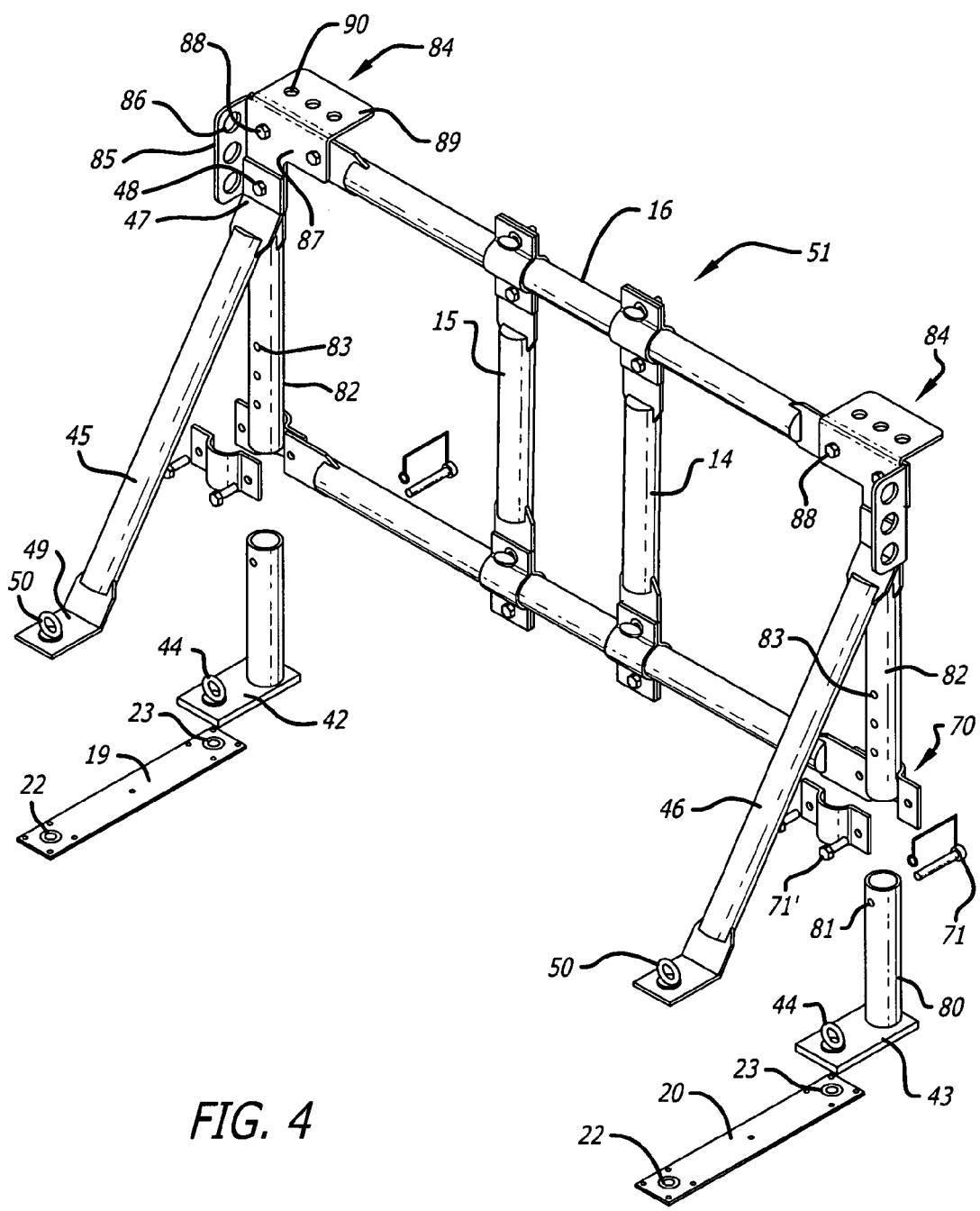
FIG. 4 is an exploded view of a modification of the rack of FIG. 1.

As seen if FIG. 4, wherein like numerals refer to like parts of he embodiment of FIGS. 1 to 3, height adjustment means may be provided for allowing proper mating of front tires of differing diameters to the rack. Thus, a vertical hollow tube 80 is provided on each side of the rack of a predetermined length, such as 8". Tube 80 is fixed to locking plate 43, as by welding or the like, and extends upwardly therefrom. Tube 80 has a through hole 81 at its upper end.

Figure 5:
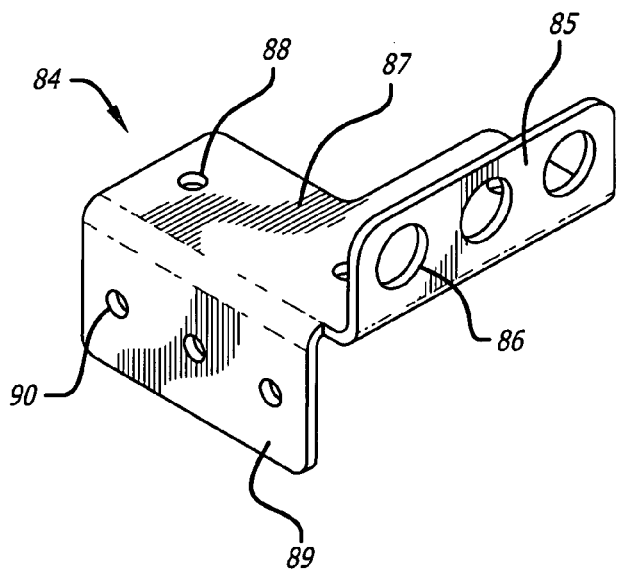
FIG. 5 is a perspective view of one of the components of the rack of FIG. 1.

Instead of leg 41, an elongated vertically extending tube 82 is provided of a diameter slightly less than the inner diameter of tube 80 which extends down through tube 80 and is reciprocal therein. Tube 82 has a plurality, such as 3, of spaced through holes 83. A flange plate 84 (see FIG. 5) is provided having a first flange portion 85, with a plurality of spaced holes 86, such as 3, extending therethrough. Plate 84 has a flange portion 87 extending generally normal thereto having spaced holes 88 extending therethrough. A third flange portion 89 extends from flange portion 87, generally normal thereto, and has a plurality, such as 3, of spaced holes 90.

Thus, instead of flanges 33, 34, flange plates 84 are provided at the upper end of the rods 45, 46 and tube 82 to provide adjustment of rods 45, 46 as will be discussed.

The height adjustment may be quickly and easily accomplished by loosening bolts 71 clamping rail 17 to vertical legs 82 using collars 70 and removing bolts 71. The bolts 48 are also removed from the upper end of the diagonal rods 45, 46. The new height of the tubes 80, 82 is adjusted and the bolts 71, 48 are replaced in their new positions and tightened. The clamp bolts 71' are also tightened and the rack is ready for a different diameter front tire.

The flange plates 84 also provide a means for securing accessories to the plates 84 using holes 90. Thus, accessories may be bolted to flange portions 89 of flange plates 84 and thus to the rack. Such accessories may be items such as storage baskets, canoe or kayak cradles, bench seating, etc., which items may be attached to a solid base (not shown) secured to the bed of the vehicle.

Figure 6:
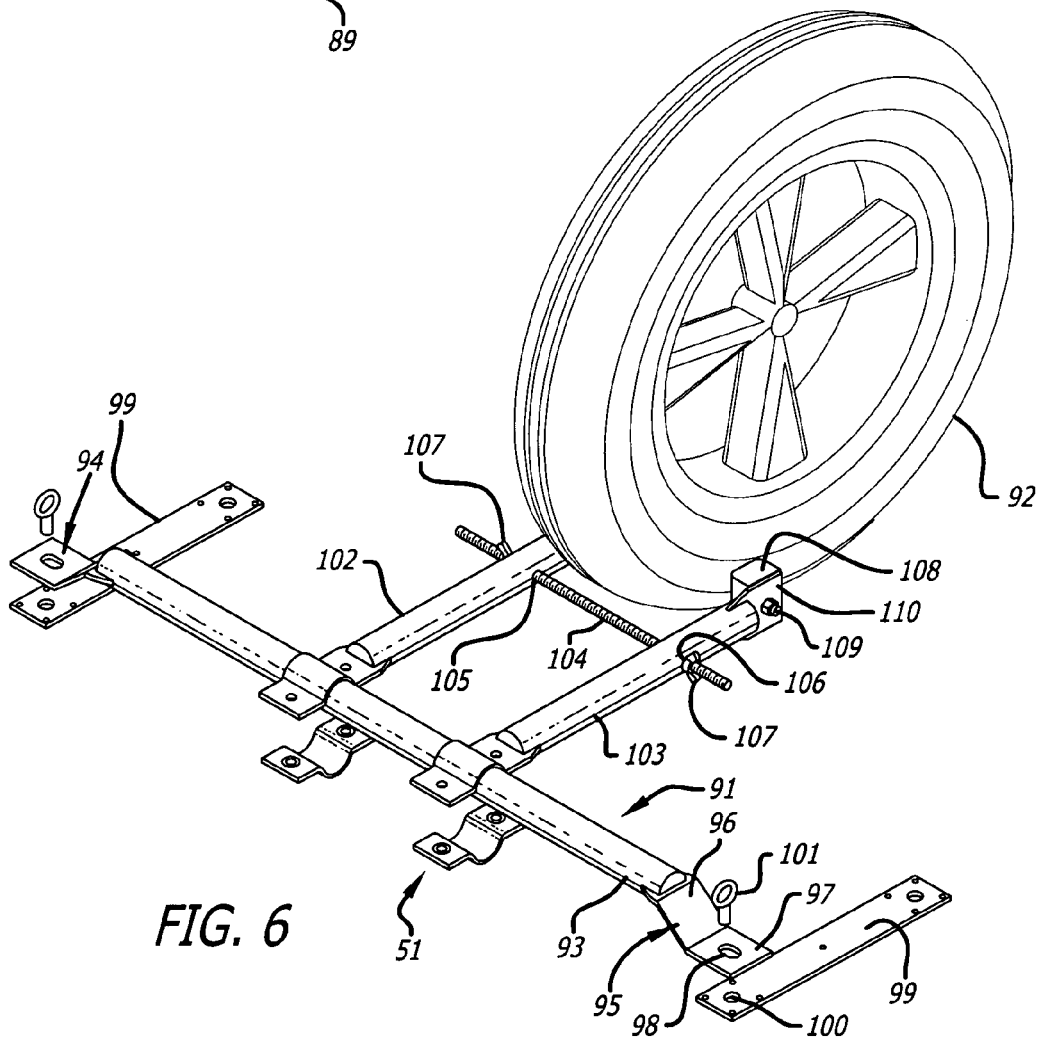
FIG. 6 is a perspective view of an added feature for the racks of FIGS. 1 to 5.

As seen in FIG. 6, a rear tire stabilizer 91 may be provided for stabilizing the rear wheel 92 (the remainder of the vehicle of which wheel 92 is a part of being removed from convenience of illustration). This arrangement restrains the rear tire 92 from shifting side to side when being transported. Thus, stabilizer 91 includes an elongated tube 93 having flattened end portions 94, 95 at each end. Each end portion has a first angled downwardly extending flattened portion 96 integral with a second flattened portion 97, having a hole 98 therethrough, which extends in a plane generally parallel to the longitudinal axis of tube 93. Flattened portion 97 is adapted to be secured to a monitoring flange plate 99, having a hole 100, for receiving threaded turn buckle 101 through aligned holes 98, 100. Flange plate 99 may be secured to the bed of the vehicle as heretofore discussed with respect to plates 20. Flange plates 99 are mounted in line with flange plates 19 and 20 of FIGS. 2 and 4 but of course far enough so as to be behind the rear wheel 92.

A pair of spaced guide clamp bars 102, 103 are adjustably mounted along tube 93. Clamps 51, identical to clamps 51 of FIGS. 2, 3 and 4, may be used with tube 93 extending therebetween.

An elongated threaded clamp bolt 104 is provided extending through aligned holes 105, 106 in bars 102, 103 with wing nuts 107 threaded thereon to allow rubber pads 108 mounted by bolts 109 at the ends of each bar 102, 103 to grip tire 92 therebetween. That is, each bar 102, 103 terminates in a flattened end 110 receiving bolt 109 therethrough and through pads 108 (the pad 108 at the end of bar 102 not being visible in FIG. 6.) When it is desired to remove the bike or motorcycle from the rack, wing nuts 107 are loosened and the wheel 92 is released.

It can be seen that there is disclosed a racking system for transporting motorcycles, ATVs, etc. on the bed of a vehicle, such as a pickup truck, or trailer, in an upright manner. The floor plates 19, 20, 99 may be left in the bed of the vehicle when the rack is removed, the motorcycles and the like are transported in a safe and secure manner and prevented from moving about the truck or trailer. Standard tie down straps may be used to secure the devices to the holes 39.

The rack may be removed to clear the floor space for other use or activity when not hauling such devices.

The rack is modular and expandable. Such add-ons may be provided as an expansion kit.

Any suitable materials may be used, such as lightweight tubing, e.g., 1½" in diameter. Such tubing may be pressed, bent, welded, formed and drilled. Flat steel bar stock may be used. Off the shelf fasteners may be used. The surfaces may be powder coated for protection and appearance. The floor plates may be made from flat metal and laser cut to precise dimensions so as to allow the unique nut inserts to be press fit onto them. The inserts stay on the rack when removed and the plates allow for quick reinstallation. Also, eyebolts may also be used.

The racks may be used as security locks for the devices when not in use. Optional wheel lock bars may be provided. Foam padding may be used to protect against scratching or marking cargo. Finally, the parts may all be packaged and sold as a kit.

The term "vehicle" is used herein to refer to any wheeled transport, such as a trailer, pickup truck, toy hauler or other type of trailers.

Although a particular embodiment of the invention is disclosed, variations thereof may occur to an artisan and the scope of the invention should only be limited by the scope of the appended claims.

I claim:

1. A racking system adapted to be mounted to a flat bed of a vehicle comprising a pair of spaced horizontally extending rails, each of said rails having vertically extending posts fixed to the ends thereof adapted to be removably secured to the flatbed of the vehicle; and at least a pair of vertically extending rods interconnecting said spaced rails, each of said rods being adjustably mounted to said rails, wherein each of said rails terminates at its respective ends in first flat flanges and each of said posts terminates at its upper ends in an upper flat flange fixedly secured to the first flat flanges of said rails.

2. The system of claim 1 including an apertured tie down flange extending from each of said upper flanges at the upper ends of said posts.

3. The system of claim 2 wherein each of said posts terminates at its lower end in a flange, said system further including a pair of spaced floor plates adapted to be secured to the flat bed of the vehicle, said flanges at the lower ends of said posts being removably secured to each of said floor plates.

4. The system of claim 3 wherein each of said floor plates has a threaded hole therein, each of said flanges of said posts having a turn bolt fixed thereto adapted to be removably threaded to the holes in said floor plates.

5. The system of claim 3 including a diagonally extending post interconnecting the upper ends of each of said vertically extending post to a flange at the lower end thereof, the flanges of said diagonally extending posts being removably secured to each of said floor plates.

6. The system of claim 5 wherein each of said floor plates has a second threaded hole therein spaced from the first-mentioned threaded hole, and each of said flanges at the lower end of said diagonally extending posts having a turn bolt fixed thereto adapted to be removably threaded to the second holes in said floor plates.

7. A racking system adapted to be mounted to a flat bed of a vehicle comprising a pair of spaced horizontally extending rails, each of said rails having vertically extending posts fixed to the ends thereof adapted to be removably secured to the flatbed of the vehicle; and at least a pair of vertically extending rods interconnecting said spaced rails, each of said rods being adjustably mounted to said rails, wherein each of said rods are connected at the top and bottom thereof to said rails by a collar, each of said collars having a central outwardly curved portion with integral flange portions extending on each side of said curved portion, said rails extending between said curved portions, one of said flange portions of said collars being fixedly secured to the upper end of said rods and the other of said flange portions having a threaded adjustable bolt interconnecting the same for adjusting the positions of said rods along said rails.

8. The system of claim 7 wherein each of said posts includes a pair of telescoping post sections, said post sections including a first lower member and a second upper member, and aligned holes in each of said members for receiving a bolt therethrough.

9. The system of claim 8 wherein said upper member has a plurality of spaced holes and said lower member has at least one spaced hole.

10. A racking system adapted to be mounted to a flat bed of a vehicle comprising a pair of spaced horizontally extending rails, each of said rails having vertically extending posts fixed to the ends thereof adapted to be removably secured to the flatbed of the vehicle; and at least a pair of vertically extending rods interconnecting said spaced rails, each of said rods being adjustably mounted to said rails, including said rails comprising an upper rail and a lower end, said upper rail being coupled to the upper ends of said posts, and a flange plate fixedly secured to the upper rail, each of said flange plates having an integral apertured flange portion extending away from said upper rail.

11. A racking system adapted to be mounted to a flat bed of a vehicle comprising a pair of spaced horizontally extending rails, each of said rails having vertically extending posts fixed to the ends thereof adapted to be removably secured to the flatbed of the vehicle; and at least a pair of vertically extending rods interconnecting said spaced rails, each of said rods being adjustably mounted to said rails, including a rear wheel stabilizing device adapted to be mounted to the flat bed of the vehicle having a motorcycle mounted on said flatbed spaced from said rails, said stabilizing device including an elongated tube having a pair of spaced guide clamp bars adjustably mounted along said tube, each of said guide clamps extending away from said tube and having free ends terminating in resilient tire grasping means adapted to resiliently grasp the rear wheel of the motorcycle having its front wheel mounted between said rods.

12. The system of claim 11 including a threaded rod extending traverse to the longitudinal axis of said clamps through aligned holes therein having a free end on opposite sides of said clamps, and adjusting nuts threaded on the free ends of said rod for clamping said clamps.

13. The system of claim 11 wherein said tube terminates at each end thereof in a first downwardly extending angled flange portion integral with a second flat portion lying in a plane generally parallel to the longitudinal axis of said tube, said flat portion being apertured and adapted to be secured to an apertured first flange plate fixedly secured to the bed of the vehicle.

14. The system of claim 13 wherein each of said posts terminates at its lower end in a flange adapted to be secured to a second flange plate fixedly secured to the bed of the vehicle, said first flange plates being spaced from and vertically aligned with said second flange plates.

* * * * *